United States Patent [19]

Delmas et al.

[11] Patent Number: 4,816,737
[45] Date of Patent: Mar. 28, 1989

[54] DEVICE FOR CONTROLLING THE CHARGING OF RECHARGEABLE BATTERIES

[75] Inventors: Gilles Delmas, Paris; Jean-Pierre Hazan, Sucy-en-Brie; Michel Steers, La Queue-en-Brie, all of France

[73] Assignee: U.S. Philips Corporation, New York, N.Y.

[21] Appl. No.: 156,374

[22] Filed: Feb. 16, 1988

[30] Foreign Application Priority Data

Feb. 18, 1987 [FR] France .................................. 87 02071

[51] Int. Cl.$^4$ ........................ H02J 7/04; H01C 1/012; H01M 10/44
[52] U.S. Cl. .......................................... 320/35; 320/2; 338/308
[58] Field of Search ............... 320/2, 35, 36; 338/307, 338/308

[56] References Cited

U.S. PATENT DOCUMENTS

| | | | |
|---|---|---|---|
| 3,477,055 | 11/1969 | Herbst et al. | 338/307 X |
| 3,601,679 | 8/1971 | Braun et al. | 320/35 |
| 3,917,990 | 11/1975 | Sherman, Jr. | 320/35 |
| 4,282,507 | 8/1981 | Tindall et al. | 338/307 X |
| 4,370,606 | 1/1983 | Kakumoto et al. | 320/35 |
| 4,727,006 | 2/1988 | Malinowski et al. | 320/35 X |

*Primary Examiner*—R. J. Hickey
*Attorney, Agent, or Firm*—Bernard Franzblau

[57] ABSTRACT

A device for contolling the charging of rechargeable batteries comprises two temperature sensors deposited on a flexible thin thermally and electrically insulating sheet. The thin sheet is disposed around the rechargeable battery so that one of the sensors determines the temperature of the battery and the other sensor determines the ambient temperature. A charge stopping device stops the charging of the battery when the difference between the temperatures determined by the two sensors has reached a predetermined value. The sensors consist of resistors applied by silk screen printing and disposed in a Wheatstone bridge arrangement.

10 Claims, 4 Drawing Sheets

DEVICE FOR CONTROLLING THE CHARGING OF RECHARGEABLE BATTERIES

BACKGROUND OF THE INVENTION

The invention relates to a device for controlling the charging of rechargeable batteries comprising electric means for supplying charging current to the battery, a first temperature sensor sensitive to the temperature of the battery, a second temperature sensor sensitive to the ambient temperature and a device for stopping the charging at the end of the charging operation and controlled by the first and second sensors.

At the end of the process of charging the rechargeable batteries, especially nickel-cadmium batteries, a very high increase of pressure and an increase in temperature occur. If the charging is not stopped in time, this may lead to a rapid deterioration of the batteries by overpressure and/or by an excessively high temperature. This increase in temperature becomes very rapid at the end of the charging operation when the charge approaches 100 % of the battery capacity. It is therefore necessary to stop the charging when the charge approaches this maximum value.

A suitable method consists in tracking the temperature of the battery. A charging device which has effected this operation is known from the document U.S. Pat. No. 4,370,606 in which the temperature sensors, which are diodes or thermistors, become active according to different laws of compensation in an electronic circuit acting upon the charge stopping device.

Now, the temperature sensors used according to this document are discrete elements having a non-negligible volume. They have to be disposed in a mechanical support with the result that their thermal contact is of low quality. This also applies to the case in which these elements are used in an isolated manner.

SUMMARY OF THE INVENTION

On the other hand, batteries and battery charging devices are very frequently used and these products must be very inexpensive. This is not at all the case for the discrete elements mentioned and for their supports. The technical problem thus arising consists in manufacturing a battery charging device having temperature sensors which permit of obtaining a very good thermal contact with the element whose temperature should be determined and which are very inexpensive. The solution to this technical problem consists in that the first and second temperature sensors are deposited on a thin flexible thermally and electrically insulating sheet, the thin sheet being arranged at least in part in a casing for receiving the rechargeable battery in order that the first sensor is in thermal contact with the battery when it is introduced into the casing to determine its temperature and in that the second sensor is in thermal contact with an element of the device for controlling the charging in order to determine the temperature of the immediate ambience of the casing, the charge stopping device stopping the charging of the battery when the difference between the temperatures determined by the two sensors has reached a predetermined value.

The sensors can be resistors applied by silk screen printing. They can be connected in a Wheatstone bridge arrangement.

According to a first embodiment, the two sensors are applied by silk screen printing to the same surface of the thin sheet. The thin flexible sheet can be folded back on itself. In the latter case, each sensor can be isolated from the thermal source not associated with it by twice the thickness of the thin sheet.

According to a second embodiment, the two sensors can be applied by silk screen printing each to one of the surface of the thin sheet. In this case, each sensor is isolated from the thermal source not associated with it by the thickness of the thin sheet. The silk screen printing operation is then carried out in two steps.

When they are connected in a Wheatstone bridge arrangement, the two sensors constitute a differential system which can be used in different ways for determining the end of the charging of a nickel-cadmium battery according to the thermal characteristics of the box and the behaviour of the battery for a given speed of charging. The type of electronic circuit used will depend upon the use made of the measurement of the difference of temperature.

In a first method corresponding to a simple electronic mounting, the charging is stopped when the temperature of the battery exceeds the ambient temperature by a given value dT. This value dT is determined in accordance with the type of thermomechanical mounting (casing, box, ...), in accordance with the type of battery, the speed of charging, ...

BRIEF DESCRIPTION OF THE DRAWINGS

The invention will be understood more clearly by reference to the following drawing, given by way of non-limitative example, in which.

DESCRIPTION OF THE PREFERRED EMBODIMENTS

Figure 1:
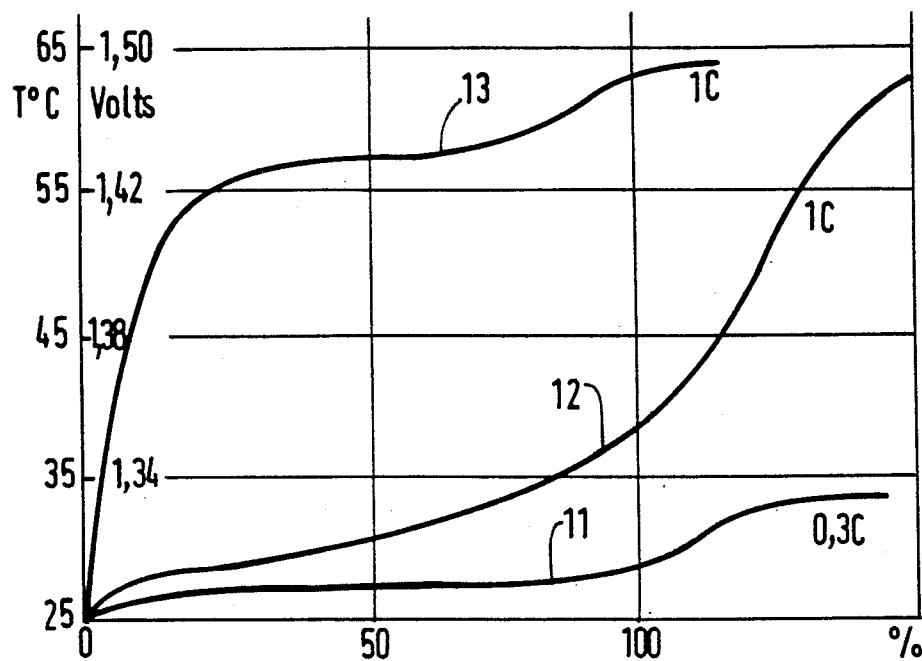
FIG. 1 shows curves of the increase of the temperature and the voltage of a nickel-cadmium battery as a function of the percentage of charge.

FIG. 1 shows two curves 11, 12 of the increase of the temperature of a battery and for charging currents of 0.3 C and 1C, respectively, where C represents the charging current of a battery equal to the nominal capacity in Ah of the battery. The curve 11 indicates that the increase in temperature remains small and substantially constant as long as the charging of the battery does not approach 100% of charge. From about 100% of charge, the increase in temperature becomes larger and then the curve exhibits an inflection point and subsequently increases less rapidly. This increase in temperature is due to the fact that, when the process of oxidation of nickel hydroxide is terminated and the charge is complete, the charging current is used solely to generate oxygen on the positive electrode. Otherwise, there is an electrochemical reaction at the cathode, which permits of recombining oxygen emitted at the anode entirely or in part while releasing heat. The curve 12 represents the same mechanisms, but taking into account a considerably higher charging current, i.e. 1C, the increase in temperature being effected much more rapidly. In this case, the inflection point is displaced and its position depends upon the dimensional and thermal characteristics of the battery and of its ambience. Upon a strong increase in temperature, a deterioration of the battery can occur. The curve 13 represents the variations of the voltage at the battery during the charging operation. It appears that the temperature variations are much more significant when the charge is approximately 100%. These curves 11,12 of increase of temperature are represented for an ambient temperature of 25° C. They remain substantially analogous when the ambient temperature lies somewhere between a low temperature and a high temperature in the usual operating conditions. The temperature sensors according to the invention will therefore permit of adapting the charge of the battery to different ambient temperatures while using a differential mode of operation.

Figure 2:
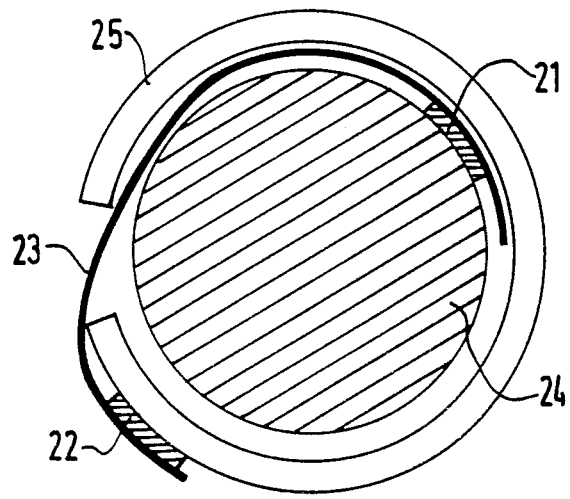
FIG. 2 shows an arrangement of the sensors deposited on the flexible support according to the invention in a first embodiment.

FIG. 2 shows the arrangement of the sensors 21, 22 of the thin flexible sheet 23 with respect to the battery 24 and to the casing 25 of the battery. The thicknesses of the sensors 21,22 and of the flexible thin sheet 23 are exaggerated arbitrarily in the FIG. The flexible thin sheet may be formed from kapton, polyesters, mylar or other polymers. The sensors 21,22 are resistors applied by silk screen printing to the same surface of the flexible thin sheet. The diameter of the battery 24 and that of the casing 25 are chosen so that the flexible thin sheet coated with its sensor 21 is inserted with small friction into the space between the battery 24 and the casing 25. Thus, the sensor 21 is brought into contact with the battery 24. The other end of the flexible thin sheet 23 carries on the same surface the second sensor 22. It leaves the space in order that the sensor 22 is applied to the outer wall of the casing 25 by means of the box (not shown in the FIG.) of the charging device.

Figure 3:
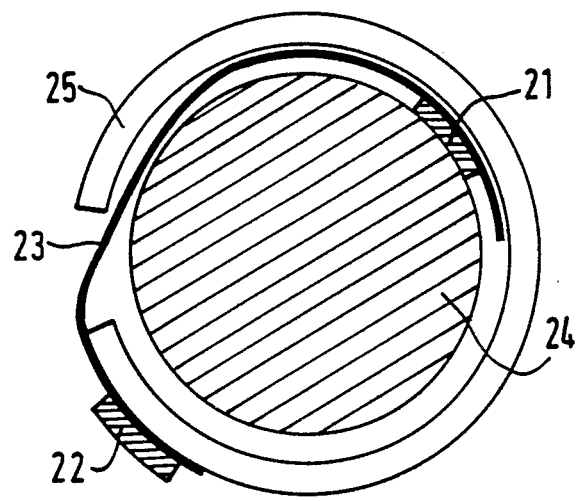
FIG. 3 shows another arrangement according to a second embodiment.

FIG. 3 shows another arrangement of the elements. The difference between FIG. 3 and the arrangement shown in FIG. 2 consists in that the sensor 22 is disposed on the second surface of the flexible thin sheet 23. The sensor 22 is thus in thermal contact with the box of the charging device.

Figure 4:
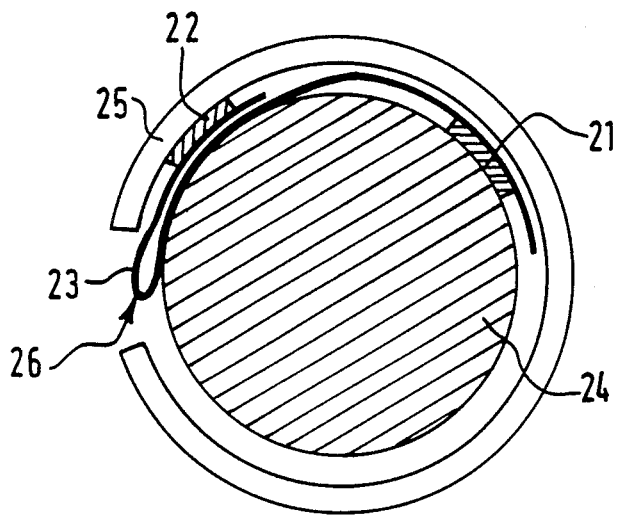
FIG. 4 shows another arrangement according to a third embodiment.

FIG. 4 shows another arrangement of the elements. In this case, the two sensors 21,22 are applied by silk screen printing to the same surface of the flexible thin sheet 23. As in the preceding FIGS., the sensor 21 is in contact with the battery 24, but in this case the sensor 22 is in contact with the inner surface of the casing 25. Thus, the space present between the casing 25 and the battery 24 is determined in order that the flexible thin sheet can be inserted into it while being folded on itself. The fold 26 can remain accessible to facilitate the assembling and disassembling of the elements. In a manner analogous to the representations of FIGS. 2 and 3, the sensor 22 disposed on the folded sheet can be situated on the outer side of the casing and can ascertain either the temperature of the casing or the temperature of the box of the charging device.

FIGS. 2 and 4 indicate a solution in which the two sensors are disposed on the same surface of the flexible thin sheet. This has an advantage in carrying out the silk screen printing operation. In the case of FIG. 3, in which the sensors are deposited on different surfaces, it may be necessary in accordance with the design of the connections to provide, for example, holes for passing the connections through the flexible thin sheet. The flexible thin sheet being thermally and electrically insulating, each sensor is thus thermally insulated from the element, of which it need not determine the temperature.

FIGS. 2, 3 and 4 are shown with a battery and a casing of circular cross-section, but a different cross-section is also suitable.

Figure 5:
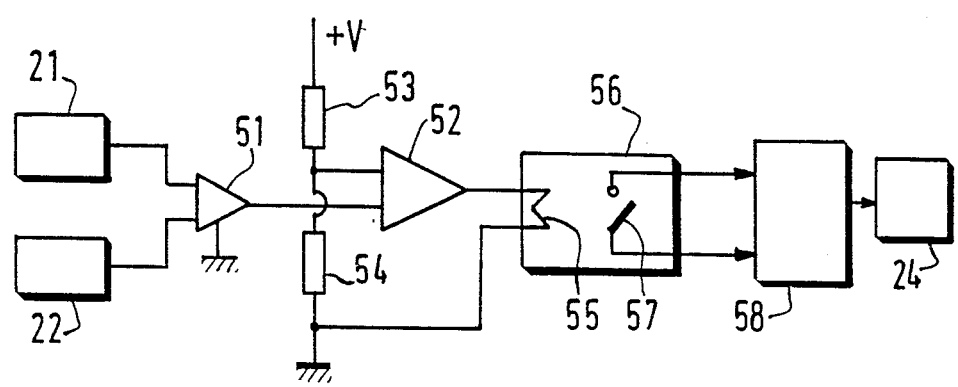
FIG. 5 shows an electric principle circuit diagram of the device for charging rechargeable batteries according to the invention.

FIG. 5 shows an electric circuit diagram of the device for charging a battery according to the invention. The two sensors are each constituted, for example, by a resistance varying with temperature. Each resistor is connected to an electric supply source and is combined with an operational amplifier 51, which supplies a temperature difference signal which is introduced into a comparator 52. The second input of the comparator is connected to the junction point of a resistive divider bridge 53,54. The comparator 52 excites the coil system 55 of a relay 56, of which the contactor 57 acts upon the electrical means 58 for supplying a charging current that feeds the battery 24. The resistive divider bridge 53,54 determines an electrical voltage representative of the predetermined value at which the charging current should be modified. This predetermined value is determined by means of, for example, temperature increase curves, such as the curves 11,12 of FIG. 1. According to the dimensions, the calorific capacities and the thermal exchanges at the battery 24 as well as at the casing 25 and at the box of the charging device, the thermal balance with the environment will be specific for each device. Therefore, for different charging currents, different curves of temperature increase of the battery in its casing and in its box are drawn. According to the desire of the user, a more or less rapid charging will be aimed at, which will determine the desired charging current. The increase in temperature for a charge of 100% can then be determined on said curves and can constitute the temperature difference aimed at for determining the resistive divider bridge 53,54 of FIG. 5. This difference is, for example, 12° for a current of 1 C in FIG. 1. The difference with respect to the ambient temperature thus determined constitutes, for example, the predetermined value.

Figure 6:
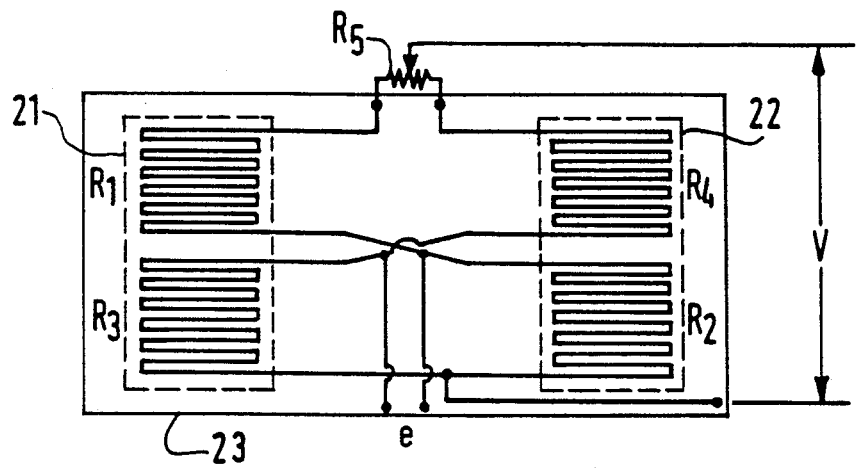
FIG. 6 shows a diagram of implantation of the two sensors according to a Wheatstone bridge.

Preferably, the invention utilizes sensors 21, 22 each constituted by two resistors, whose values vary in an appreciable manner with temperature, the assembly being mounted in the form of a Wheatstone bridge. FIG. 6 shows a sensor 21 constituted by resistors R1 and R3 and a sensor 22 constituted by resistors R2 and R4. These resistors are arranged in a series in the form of a loop according to the order R1,R2,R3,R4. The Wheatstone bridge thus obtained is energized across to one diagonal and supplies an unbalance signal e across the other diagonal. it is possible to arrange a potentiometer R5 for taking into account the small resistance variations due to the realisation or to ageing and for thus balancing the bridge in the absence of thermal effects. The four resistors R1,R2, R3,R4 are arranged on the flexible thin sheet 23.

If R1 and R3 are the resistors which are in contact with the battery and R2 and R4 are the resistors which are in contact with the ambient temperature, there is a signal e equal to:

$$e = \frac{v}{4}\left(\frac{dR1}{R1} + \frac{dR3}{R3} - \frac{dR2}{R2} - \frac{dR4}{R4}\right)$$

where v is the supply voltage of the Wheatstone bridge. A balancing of the bridge can be obtained at the beginning of the measurement. The resistors vary with temperature. By simplification, it can be considered that these relative variations are linear and have the form $dR/R = aT$. If otherwise the resistors R1 and R3 on the one hand and R2 and R4 on the other hand vary in the same manner, there is:

$$e = \frac{v}{4}(2aT1 - 2aT2)$$

i.e. $e = \frac{v}{4} a(T1 - T2)$

This equation indicates that the sensor is a differential sensor, which supplies a signal depending upon the difference between the temperature of the battery and the ambient temperature. The evolution of the signal as a function of the charging time depends upon the thermal characteristics of the box, upon the speed of charging, ... The conditions otherwise being the same, the determination of an end of charging will be influenced to a considerably smaller extent by the ambient temperature with a differential temperature measurement.

Figure 7:
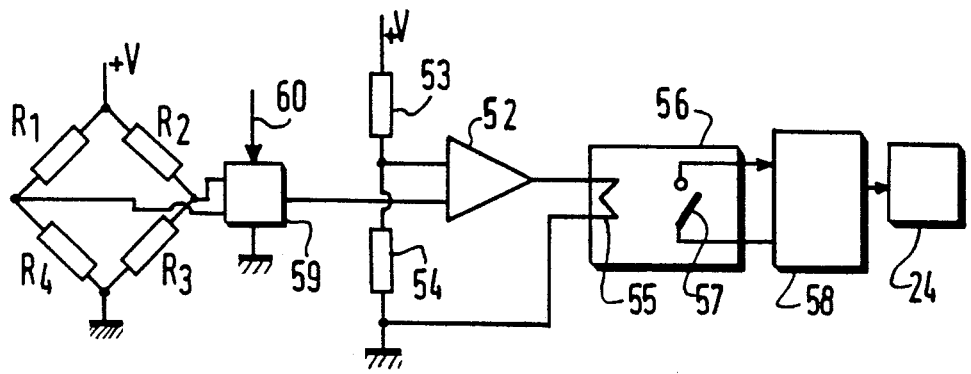
FIG. 7 shows an electric circuit diagram analogous to that of FIG. 5 with the diagram of implantation shown in FIG. 6.

The diagram of FIG. 6 can be used in the apparatus of FIG. 5 for obtaining that of FIG. 7. The unbalance voltage of the bridge is introduced into an amplifier 59, which supplies a signal to the comparator 52. Instead of the potentiometer R5 of FIG. 6, it is possible (FIG. 7) to introduce a compensation signal 60 at the amplifier 59. The other elements are identical to those of FIG. 5.

The invention has been described with the use of a predetermined value chosen from curves of increase of temperature of the battery established beforehand by giving it a fixed value. It is also possible to use the measurement of the temperature difference permitted by the invention according to another criterion. Thus, it has been found on the curves of FIG. 1 that the curve of the increase of temperature has an inflection point when the charge is approximately 100%. It is therefore possible to utilize the temperature difference determined by the invention by determining this inflection point and by stopping the charging of the battery when this inflection point is reached. This may be effected, for example, by means of a microprocessor, which determines in real time under real operating conditions the temperature difference represented in FIG. 1 and determines the variations of this difference at regularly spaced instants.

When the charging device contains two batteries, it is possible to arrange the resistor R1 on one battery and the resistor R3 on the other battery, in order that the device for controlling the charging be activated on the battery which heats most quickly.

On the other hand, the charging stopping device can be operated by means of an ON/OFF control or by a progressive reduction of the charging current. A microprocessor can permit of rendering the different reductions of charging current automatic and of supplying the compensation voltage intended to compensate for the signal variations due to ageing of the resistors.

What is claimed is:

1. A device for controlling the charging of rechargeable batteries comprising, electric means for supplying charging current to the battery, a first temperature sensor sensitive to the temperature of the battery, a second temperature sensor sensitive to the ambient temperature, and a device controlled by the first and second sensors for stopping the charging at the end of the charging operation, wherein the first and second temperature sensors are deposited on a thin flexible thermally and electrically insulating sheet, the thin sheet being arranged, at least in part, in a casing for receiving the rechargeable battery in a manner such that the first sensor is in thermal contact with the battery when it is introduced into the casing thereby to determine its temperature and the second sensor is in thermal contact with an element whose temperature is substantially equal to ambient temperature in order to determine the temperature of the immediate surroundings of the casing, the charge stopping device stopping the charging of the battery when the difference between the temperature determined by the two sensors has reached a predetermined value.

2. A device as claimed in claim 1, characterized in that said element at ambient temperature is the casing.

3. A device as claimed in claim 1, wherein the sensors comprise resistors applied to the insulating sheet by silk screen printing.

4. A device as claimed in claim 3, characterized in that the sensors are connected in a Wheatstone bridge arrangement.

5. A device as claimed in claim 3 wherein the two sensors are situated on opposite surfaces of the flexible thin sheet.

6. A device as claimed in claim 1 wherein the two sensors are mounted on the same surface of the flexible thin sheet.

7. A device as claimed in claim 6, characterized in that the flexible thin sheet is folded on itself.

8. A device as claimed in claim 2 wherein the sensors comprise resistors applied to the insulating sheet by silk screen printing.

9. A device as claimed in claim 1 wherein the two sensors are situated on opposite surfaces of the flexible thin sheet.

10. A device as claimed in claim 3 wherein the two sensors are mounted on the same surface of the flexible thin sheet.

* * * * *